United States Patent [19]

Eatough et al.

[11] Patent Number: 5,752,993
[45] Date of Patent: May 19, 1998

[54] BLAST FURNACE FUEL FROM RECLAIMED CARBONACEOUS MATERIALS AND RELATED METHODS

[75] Inventors: Craig Norman Eatough, Provo; George W. Ford, Jr., Salt Lake City; Richard C. Lambert, Lehi, all of Utah

[73] Assignee: Covol Technologies, Inc., Lehi, Utah

[21] Appl. No.: 749,752

[22] Filed: Nov. 15, 1996

Related U.S. Application Data

[63] Continuation-in-part of Ser. No. 591,851, Jan. 25, 1996, Pat. No. 5,599,361, which is a continuation of Ser. No. 354,693, Dec. 13, 1994, Pat. No. 5,487,764, which is a continuation of Ser. No. 184,099, Jan. 21, 1994, Pat. No. 5,453,103.

[51] Int. Cl.$^6$ ............................................. C10L 5/02
[52] U.S. Cl. ........................... 44/553; 44/564; 44/591; 44/592; 44/607; 44/634
[58] Field of Search ........................... 44/553, 564, 592, 44/607, 634

[56] References Cited

U.S. PATENT DOCUMENTS

| | | | |
|---|---|---|---|
| 2,314,641 | 3/1943 | Wolf | 44/564 |
| 2,993,686 | 7/1961 | Schlyter | 44/564 |
| 3,655,350 | 4/1972 | Atley | 44/564 |
| 4,529,407 | 7/1985 | Johnston et al. | 44/553 |
| 5,236,468 | 8/1993 | Levine et al. | 44/564 |
| 5,453,103 | 9/1995 | Ford, Jr. | 44/553 |
| 5,599,361 | 2/1997 | Ford, Jr. | 44/553 |

*Primary Examiner*—Jacqueline V. Howard
*Attorney, Agent, or Firm*—Foster & Foster

[57] ABSTRACT

A compressed briquette or other solid shape, object, or article useful as a coke substitute in blast furnaces disclosed as being manufactured so as to comprise a reaction product of fine carbonaceous material (such as coke breeze, coke fines, or petroleum coke), a reactive tar, and polymeric binder.

23 Claims, 5 Drawing Sheets

Size classification of pulverized Geneva coke

Size distribution of as received and pulverized petroleum coke

Crushed Geneva Coke

Size analysis of pulverized and collected Geneva coke breeze

BLAST FURNACE FUEL FROM RECLAIMED CARBONACEOUS MATERIALS AND RELATED METHODS

CONTINUITY

This application is a continuation-in-part of U.S. patent application Ser. No. 08/591,851 filed Jan. 25, 1996, now U.S. Pat. No. 5,599,361, which is a continuation of U.S. patent application Ser. No. 08/354,693, filed Dec. 13, 1994, now U.S. Pat. No. 5,487,764, which is a continuation of U.S. patent application Ser. No. 08/184,099, filed Jan. 21, 1994, now U.S. Pat. No. 5,453,103.

FIELD OF THE INVENTION

The present invention involves reclaiming and utilizing fine carbonaceous materials, such as coke breeze, coal fines, and furnace revert materials, from discarded or tramp debris to produce a high energy substitute blast furnace and like fuel.

BACKGROUND

Different iron ore reduction reactions occur within a blast furnace depending on furnace operation and temperature region. Indirect reduction occurs at relatively low temperatures (850° C. to 900° C.) in the stack. This exothermic reaction can occur with carbon monoxide as indicated below.

$$3Fe_2O_3(s)+CO \rightarrow 2Fe_3O_4+CO \quad (1)$$

$$Fe_3O_4(s)+CO \rightarrow 3(FeO)+CO_2 \quad (2)$$

and $$FeO(s)+CO \rightarrow Fe+CO_2 \quad (3)$$

Another reaction produces carbon monoxide by reaction of carbon with carbon dioxide above 900° C. This reaction is highly endothermic or energy consuming.

$$C(s)+CO_2 \rightarrow 2CO \quad (4)$$

At high temperatures in the lower part of the furnace, iron and carbon monoxide are produced by carbon reacting endothermically with iron oxide by the direct reduction reaction.

$$FeO(s)+C(s) \rightarrow Fe+CO \quad (5)$$

Decreasing direct reduction in favor of indirect reduction is advantageous because the latter is exothermic and lowers the overall heat requirements for the blast furnace. Increasing the CO or $H_2$ content of the blast furnace gas increases the rate of indirect reduction.

Metallurgical coke traditionally is used in the blast furnace as (1) a fuel to provide heat to meet the endothermic requirements of chemical reactions and melting of the slag and metal, (2) a producer and regenerator of reducing gases for the reduction of iron oxides, and (3) an agent to provide permeability for gas flow and support for furnace burden. Because of the many requirements placed on coke, it must meet stringent requirements of strength, size, and composition. The carbon content should be maximized. As a regenerator of reducing gas the coke should have an adequate reactivity to carbon dioxide and water vapor. To provide permeability and burden support the coke should be within a narrow size range. It should be resistant to physical breakdown as it progresses through the blast furnace.

Prime coking coals (coal from which coke is produced) tend to have a volatile content between 19–33%. Since these coals are becoming scarce, economics dictates development of coal blending and/or other coke enhancing and supplementing technologies. However, the characteristics of supplemental coke products and cokes made from alternative coking technologies must fall within the strict requirements necessary for good blast furnace operation.

One coke substitute that has been used is called "form coke". Form coke is a carbonized briquetted fuel generally made from weakly caking or noncaking coals. It is produced from crushed coal which is charred at temperatures between 600° C. and 800° C., then mixed with a binder, briquetted, and finally carbonized at 900° C. to 1000° C. The initial partial devolatilization is designed to prevent swelling or stickiness of the briquettes during the high temperature treatment. The binders needed for briquetting are usually obtained from the combined by-products and tars generated during the low and high temperature pyrolysis steps.

The strength of the form coke and thus its applicability to metallurgical purposes is highly dependent on the operating variables in each of the processing steps. An example of an operable form coke operation is the FMC process operating at Kemmerer, Wyo. This facility utilizes subbituminous coals and lignites and yields small coke briquettes that have performed well in experimental blast furnaces replacing up to 30 percent of the total coke requirement.

In the past, coke breeze (a by-product of coke production), coal fines (a by-product of coal mining per se), and blast furnace revert materials (a by-product of steel production) have been routinely discarded, typically in large quantities, creating a source of pollution, presenting a fire hazard, and establishing an unsightly array of discarded material, each of which continues for decades.

Coke is essentially a high carbon content, high heat, clean burning fuel used primarily in steel-making blast furnaces and other industrial applications. It is made from metallurgical grade coal which is heated in the absence of air in large ovens. Volatile matter is driven off, leaving fixed carbon. Small pieces of coke, known as coke breeze or coke fines, are a waste product of the coke-making process. Coke breeze has, for years, been accumulated as a waste product from the above-described process by which coke is manufactured. Piles of discarded waste coke breeze are unsightly, can be ignited, and constitute an ever enlarging source of environmental pollution.

Heretofore, coke breeze per se has been unsuitable for use in blast furnaces because of its small size. Consequently, coke breeze has been of no value to the steel manufacturer using traditional processing.

Coal fines, similarly, are small coal particles, typically ranging from less than one quarter of one inch in diameter to dust size, created during coal mining operations. Coal fines are available in abundance worldwide, because they have been viewed as worthless. Thus, coal fines have historically been merely accumulated in piles at various locations, presenting storage, disposal, and fire hazard problems. Typically, coal fines are disposed of at or near the mine site in piles or trenches.

Blast furnace revert material comprises mill scale, dust, and sludge derived from the production of steel. Revert material contains a large amount of non-oxidized combustible particles or pieces. This material also has over the years been viewed as worthless and, accordingly, has been discarded in the form of massive ugly piles of useless material which present environmental and fire hazard problems, both actual and potential.

RELATED ART AND DISCLOSURE

Priority here is based upon U.S. Pat. No. 5,487,764, which disclosed a solid product, such as one in the form of briquettes and pellets. The briquettes and pellets comprised of fine carbonaceous material, such as coke breeze and/or coal fines and/or revert materials, bound together to substantially prevent degradation into smaller pieces. The briquettes are formed by first treating a fine carbonaceous material with a hygroscopic solvent, such as methyl ethyl ketone, to activate reactive sites on the carbon particles, reacting the carbon particles with a polymer, such as styrene, polyvinyl acetate, or acrylonitrile polymer, and forming the reaction mixture into articles and curing the articles. The final briquette product is the reaction product of the carbonaceous particles and the polymer. These briquettes provide a source of fuel and heat, which is clean burning, and substantially smokeless.

The briquettes formed by the process of U.S. Pat. No. 5,487,764 provides a useful product made from the fine heretofore discarded carbonaceous materials. The resulting briquettes, derived from the formation of chemical bonds between the polymer and the carbonaceous material, possess superior strengths in terms of compression, drop shatter tests, and the like. Accordingly, these briquettes are very useful as a coke substitute, such as in electric arc furnaces and the like. Blast furnaces have a very hostile environment with high temperatures and a $CO_2$ oxidizing environment. Briquettes produced using the technology of U.S. Pat. No. 5,487,764 occasionally prove to be unsuitable as a coke substitute because they sometimes disintegrate under the deleterious effects of the blast furnace environment before being oxidized. Accordingly, it is desirable to find a way to improve the briquettes produced using the technology of U.S. Pat. No. 5,487,764 to avoid premature disintegration so the briquettes can be used as a coke substitute.

BRIEF SUMMARY AND OBJECTS OF THE PRESENT INVENTION

In brief summary, the present invention overcomes or substantially alleviates the problems of the prior art. Methods are provided for forming a solid product or article suitable for a coke substitute or replacement in blast furnaces and the like which is in the form of briquettes, pellets, and/or as other solid objects.

The present invention comprises a coke substitute suitable for blast furnaces comprising shapes or articles formed as a reaction product of a process utilizing carbonaceous particles, tar, and polymeric binder. Reducing or otherwise controlling the size of the carbonaceous material to a suitable range, by heating the sized carbonaceous material to a temperature higher than the softening point of tar, adding tar and acid to the heated carbonaceous material, adding polymeric binder, blending the mixture, compressing the mixture to form discrete shapes or articles, and then drying the shapes or articles are steps typically practiced in carrying out the invention.

The present invention accommodates recycling and forming into useful products from many waste dumps of coke breeze, coal fines, and revert materials. The present invention can also be used in conjunction with ongoing coking operations to substantially avoid or largely alleviate the formation of a waste coke-breeze stream. Presently, about 10% of the output of coke ovens is fine material that is discarded, but can be used with the present process to form useful coke articles. The fine coke breeze discharged from the coking ovens can be briquetted into the solid articles using the invention. If desired, the entire output of the coke oven could be ground or otherwise crushed or pulverized, if and as required, and briquetted. In either case, a waste stream of fine carbon coke breeze is not produced and recovery and utilization of discarded coke breeze is avoided. The present invention also permits the use of low quality coking coals which form higher proportions of coke breeze.

Without being bound to any particular theory, it is believed that a reaction product between particulate carbonaceous materials, tar, and polymeric binder occurs. (The carbonaceous particles, without any treatment are not very reactive.) By blending a reactive tar composition with the carbonaceous material, a much larger number of chemically reactive sites are provided. When the carbonaceous particles and reactive tar are blended with a binder and compressed into shapes, a long chain polymer reaction product is formed. The tar is believed to bind with the carbonaceous material, through reaction of each with the binder.

With the foregoing in mind, it is a primary object of the present invention to overcome or substantially alleviate problems of the prior art.

Another object of significance is the provision of a novel method and a solid product comprised of carbonaceous particles and tar chemically bound with a binder.

A further important object is the provision of a novel method of producing a solid fuel and the resulting fuel articles, such as pellets or briquettes, for example, which articles are suitable for use in a blast or arc furnace environment.

An additional dominant object is to provide a method and solid articles which alleviates by-products comprising fine carbonaceous material.

It is a further principal object of the present invention to provide a method and a relatively large solid coke substitute derived from recycled waste material resulting from coal mining, coke production, and/or steel production.

These and other objects and features of the present invention will be apparent from the detailed description taken with reference to the accompanying drawings.

DETAILED DESCRIPTION OF THE INVENTION

Figure 1:
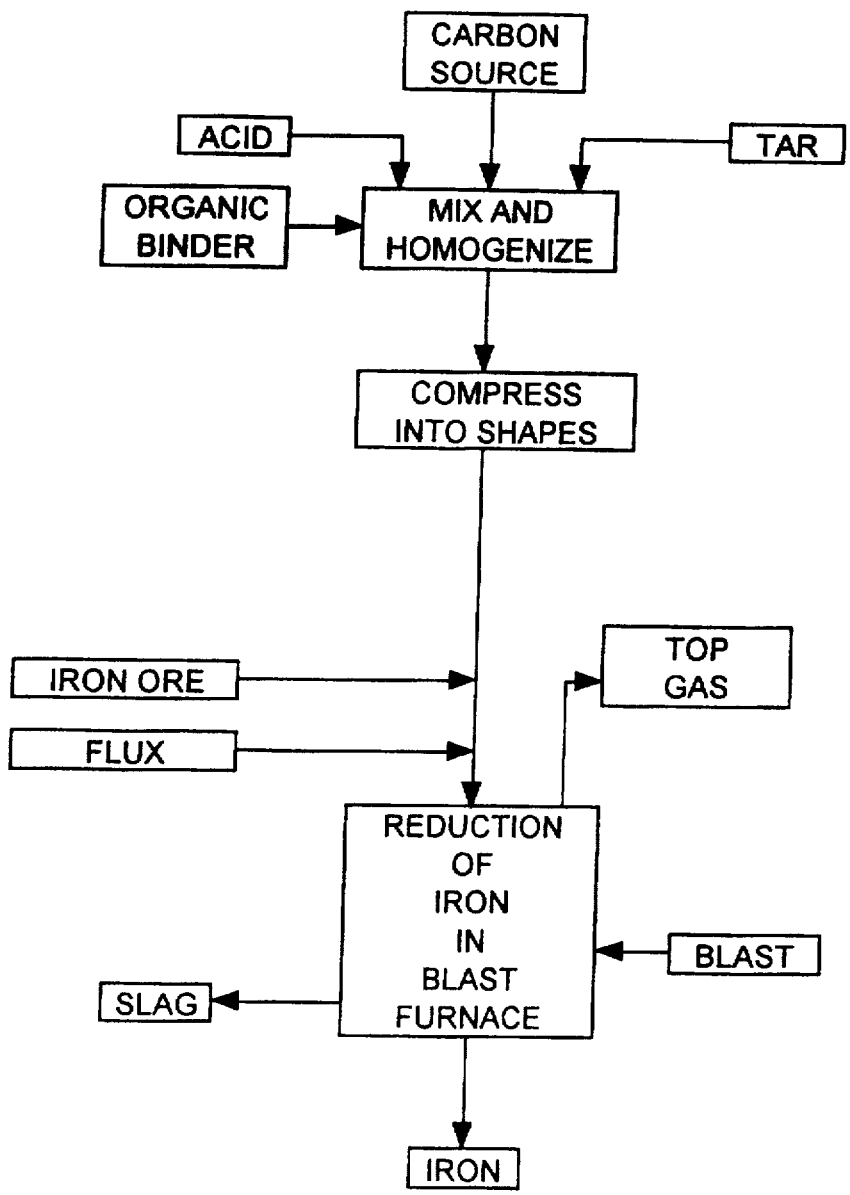
FIG. 1 is a flow chart of one process, in accordance with the principles of the present invention, by which a solid non-particulate fuel product, in the form of briquettes or pellets, is formed for example.
Figure 2A:
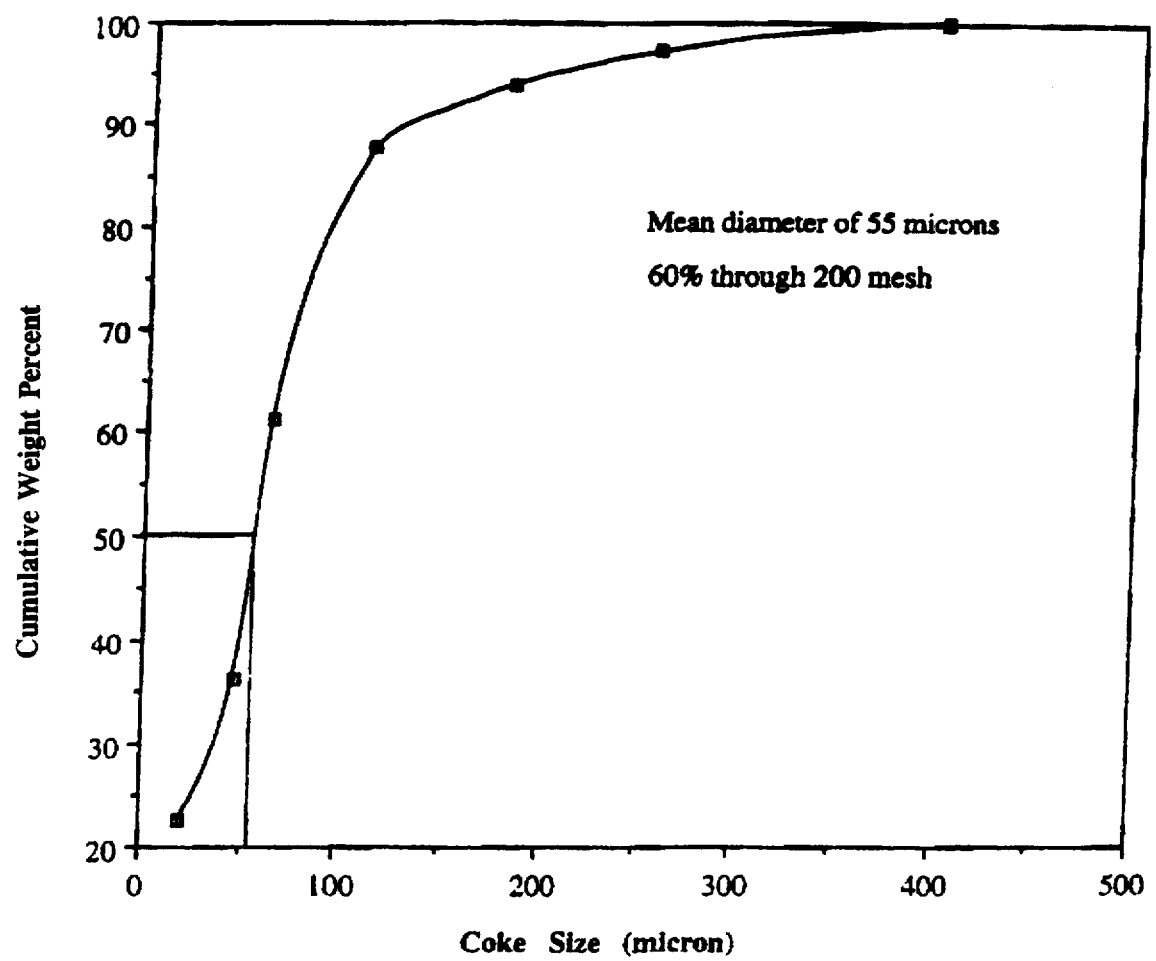
FIG. 2 is a size distribution chart for a representative type of coke breeze use in a composition of the invention.
Figure 2B:
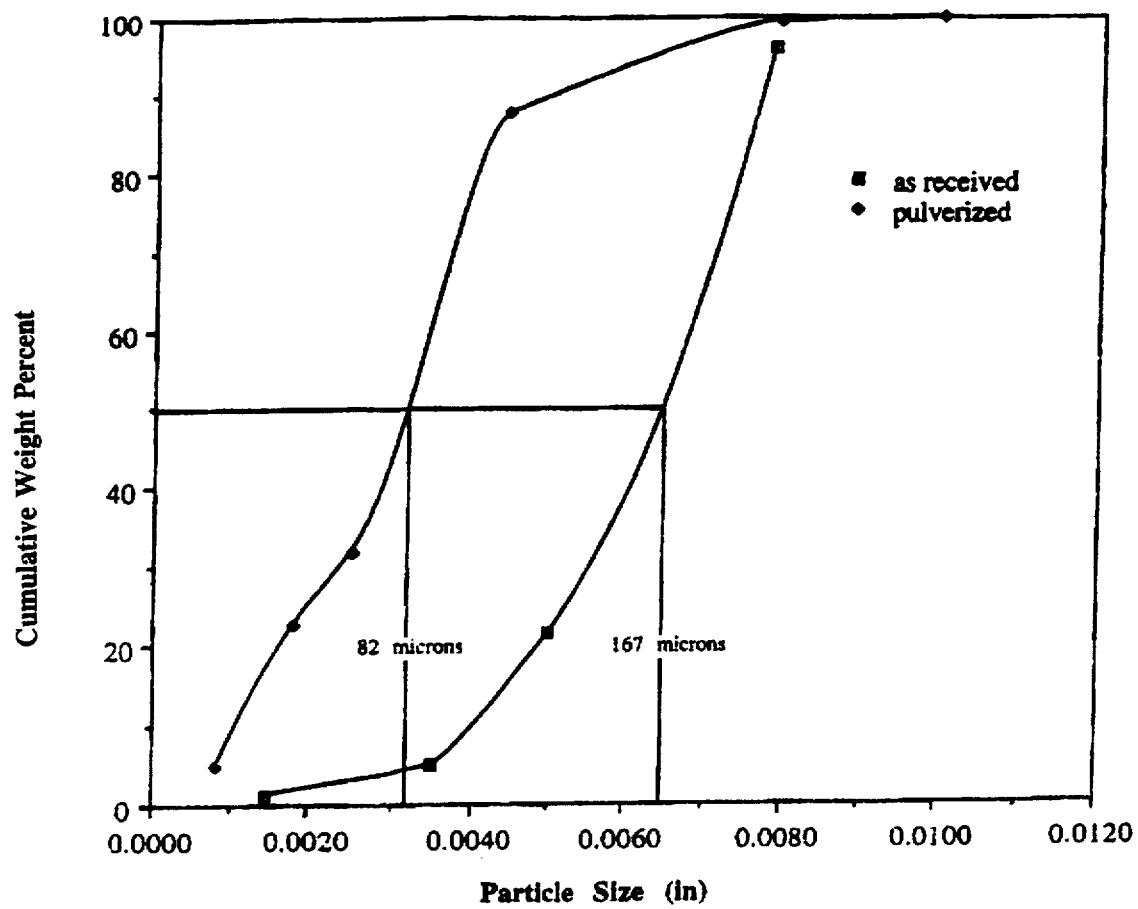
Figure 2C:
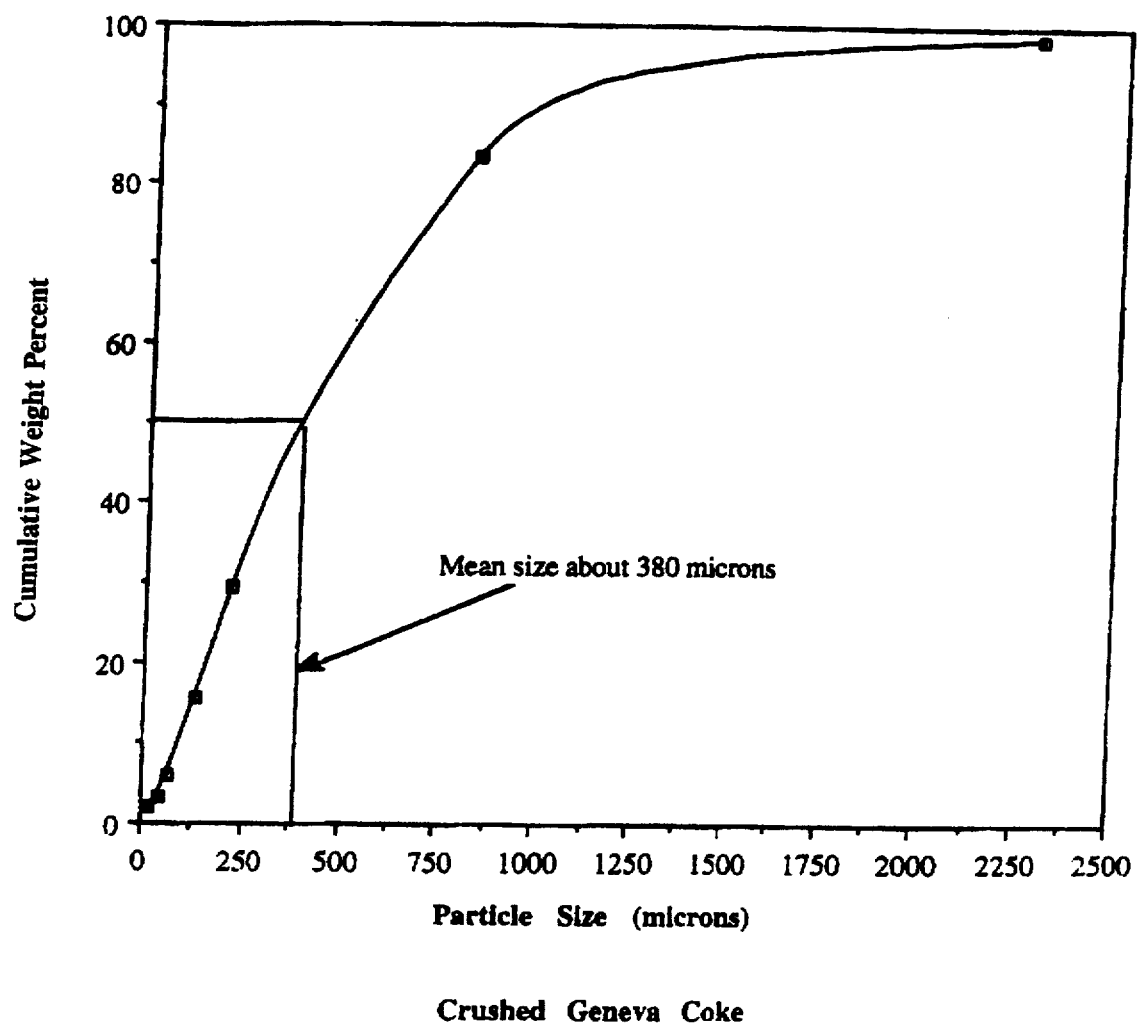
Figure 2D:
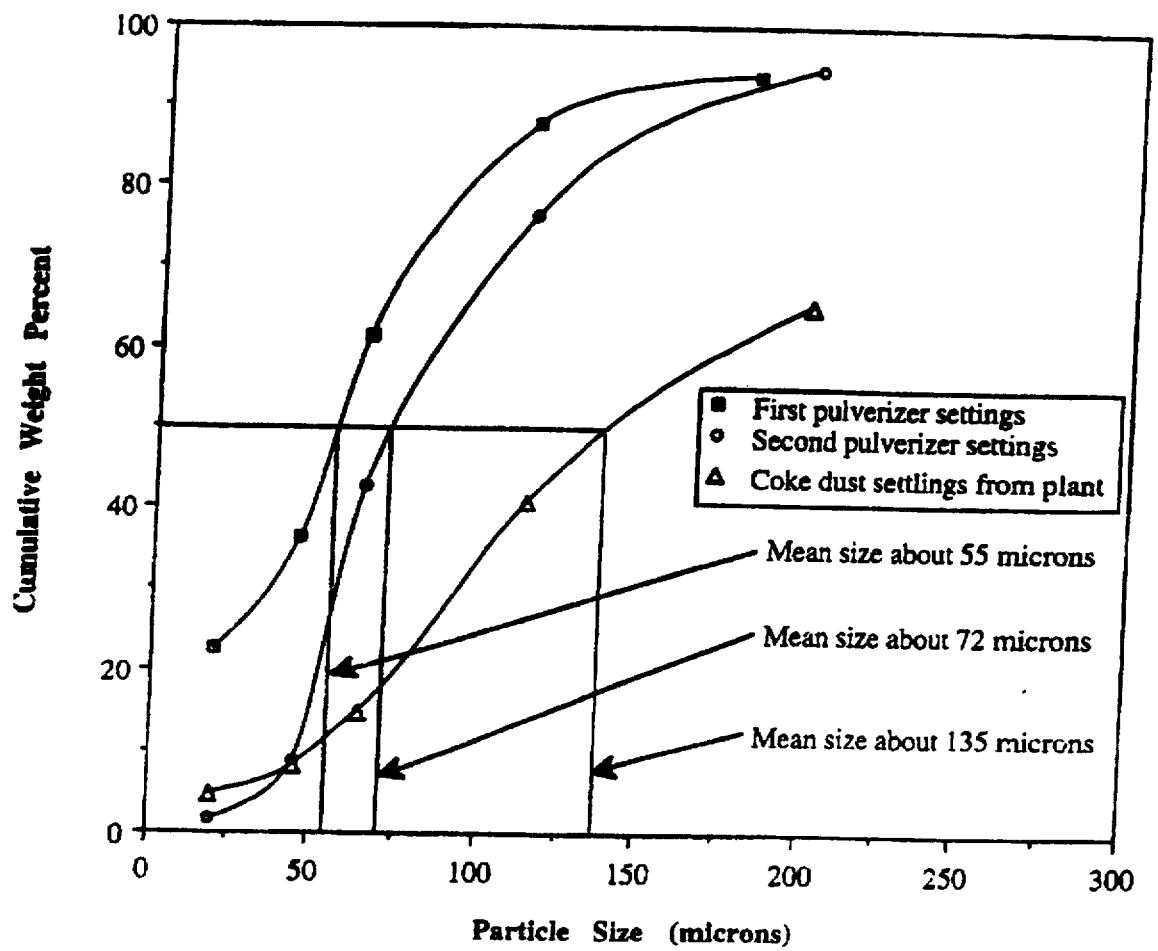

FIG. 1 is a flow diagram of a process embodying principles of the invention by which fine or particulate carbonaceous material, not heretofore of any worthwhile commercial value, is transformed into an enhanced commercial source of fuel. The carbonaceous materials presently understood to be suitable for use in the process are coke breeze, petroleum coke, finely divided metallurgical coke, coal fines, and/or revert materials. Any other similar carbonaceous material with a fine particle size may be used. Any finely divided organic carbonaceous materials would probably be suitable. Inorganic carbons and diamond dust are probably not suitable.

The carbonaceous material may have a particle size less than about ¼ inch. A preferred particle top size may be between about ⅛ inch and ¼ inch. A size distribution comprising a significant weight percent of finer particles less than 200 mesh is suitable. The finer particles help reduce voids in the final shapes (articles), which reduces susceptibility to carbon dioxide attack.

It is better if the carbonaceous material has a low ash content. For metallurgical coke, ash content may vary due to coke oven location, process parameter variation, and coal quality differences. In addition, under some conditions during manufacturing, the coke may become more porous than under other conditions resulting in weaker coke. Also, pockets of high mineral content may also weaken coke. Coarse mineral content can initiate fissure formation during contraction resulting in a decrease in strength. This weakened coke tends to fracture and disintegrate more easily, resulting in production of coke fines during handling. Also, since coke breeze is generally heaped in piles on the ground adjacent to steel refineries, handling with heavy equipment undesirably risks commingling of dirt with the coke.

Preferably, in briquette production, the ash content should not exceed about 20%. A high ash content may be detrimental to briquette quality. For example, using the same recipe, a 4-5 point improvement in strength, according to the applicable CSR parameter, has been measured with briquettes made with coke that had been washed to lower the ash content over briquettes made with the as-received coke. Also, coke blending with petroleum grade coke has shown promise to increase CSR values. The CSR test is discussed in further detail below.

Tar, within the context of the present invention, is any carbon-containing, coke-forming reactive material that can be softened, i.e., made liquid or semiliquid, at a mixing temperature with carbonaceous material, acid, and polymeric binder. "Coke-forming" means a material that has a fixed carbon content or forms a fixed carbon residue or matrix when fired or heated in a coke-forming environment. "Reactive" means a material that comprises present carbon reactive sites by which chemical bonds with the binder are formed. Tars suitable for purposes of the present invention comprise coal tars and pitches derived from coal distillation and coking processes, petroleum distillate tars and residues, and like compositions. Other suitable tar materials include any softenable material that has coke value, such as syrups of sugar (molasses) and similar carbohydrate materials and other high-molecular weight aromatic hydrocarbons. A primary consideration is cost, so inexpensive by-products of coke and petroleum processes are preferred.

The tar is blended with the carbonaceous material in an amount sufficient to form a mixture with the carbonaceous materials where the carbonaceous particles adhere to one another and in sufficient amount to provide reaction sites. However, the amount of tar must be controlled such that the mixture is not too non-viscous or viscous for appropriate compression or briquetting. Typically, the tar is added in an amount of 10 to 20 weight percent, based on the total weight of the mixture but may vary depending on the fixed carbon value of the tar. If the tar content of the mixture is too low, the amount of reactive sites may be insufficient for reaction of the binder to form shapes or solid articles having an adequate strength, as measured by the CSR test. A tar content that is too high results in a mixture too viscous to readily form into shapes (solid articles).

Before mixing, the carbonaceous material and the tar are separately heated to a temperature above the softening point of the tar, before the two are mixed in a container, which typically comprises paddles. As an example, coal tars and pitches with a softening point of about 220° F., should be heated to an elevated temperature of about 300° F.

An acid is also mixed with the carbonaceous material to activate or maximize the reaction sites. The acid may be any oxidizing acid, such as nitric, hydrochloric, sulfuric, phosphoric, carbonic, or any strong carboxylic acid such as acetic acid. The preferred acids are the strong oxidizing mineral acids, such as nitric acid and sulfuric acid.

The acid may be added, either before or after addition of the tar. Preheating of the carbonaceous material is not required before addition of the acid. However, material should be kept above the softening point of the tar. The acid is typically added in about 1 to 3 percent by weight, based upon the weight of the carbonaceous material. The acid also functions to activate the reaction sites that are introduced into the system by the tar. The order of mixing of the acid and tar is not critical.

A polymeric binder is added to the mixture. The polymer may be any polymeric binder that reacts or cross-links with the reactive sites of the tar and carbonaceous materials. The binder may not react during formation of the shape (articles) to form material amounts of undesirable compounds which contaminate the iron product in a blast furnace, pose an operating hazard, or release toxic materials into the environment. Likewise, the binder may not contribute to production of material amounts of undesirable compounds when the final shape is used in a blast furnace.

The binder is mainly to cross-link the tars and carbonaceous material Suitable binders comprise but are not limited to styrene, cross-linking styrene, polyvinyl acetate homopolymer, polyvinyl alcohol, acrylonitrile polymers, or mixtures thereof.

An object of the present invention is to form one or more shapes or solid articles or objects which comprise a reaction product between the polymeric binder, the tar, and the carbonaceous material, as opposed to a mere composite material of the carbonaceous material in a binder matrix. In the present assignee's U.S. Pat. No. 5,487,764, cited above, this object was accomplished by activating reactive sites on the surface of the carbonaceous material with a hygroscopic solvent and then reacting the carbonaceous materials therewith to form a new long chain polymer compound of the binder and carbonaceous particles. In contrast, the present invention introduces reactive sites by addition of one or more tars, activated by the acid. When the mixture of the carbonaceous material, tar, and binder has cured, it comprises a new long chain polymer compound with improved strength and oxidizing properties sufficient to function as a coke substitute.

The carbonaceous material, tar, acid, and binder are combined and blended. The mixture is then compressed into shapes (articles or objects) while the mixture is above the softening point of the tar. The pressure of compression is sufficient to form a hard, durable, although uncured shape. Typically the pressure is within the range of about 1200 and 2000 psi, 1500 psi being suitable. The shapes are then dried to lower the moisture level to less than about 4 weight percent. Drying can be under ambient conditions, although use of elevated temperatures will accelerate drying. A low moisture content is preferred, particularly when the shapes are used in an oven or blast furnace. In addition, reaction of the binder with the tar and carbonaceous material occurs during the compression and drying. Moisture has been found to somewhat inhibit the cross-linking reactions with the binder. Accordingly, removal of moisture by drying accelerates the formation of the long-chain polymer product. As stated above, drying may be done merely by air-drying or by using a drying oven, set, for example, at about 350° F. for about one hour.

The shapes are then commingled with coke to form a composite substitute for the coke. The commingled resultant is then added to a blast furnace in the same way conventional unmodified coke is conventionally used for production of iron. The shapes, articles, or objects produced in accordance with the present invention can also be used in any suitable coke consuming process, for example in other processes where coke is reacted with iron ore to form iron, such as cupola processes. Suitable processes include, but are not limited to blast furnace cupolas, iron casting furnaces, and phosphate manufacturing.

In a typical blast furnace operation, the coke/briquette mixture or commingled resultant is charged into the furnace along with iron ore and flux. The ore may be a mixture of $Fe_2O_3$, $Fe_3O_4$, and sintered pellets (an agglomeration of iron rich fines). Sintered pellets frequently also contain limestone and/or dolomite. During operation of the furnace, the solid materials within the furnace migrate downwardly. Gases from the air within the furnace and those produced by reactions within the furnace migrate upwardly through the solid bed within the furnace. An air blast within the furnace is comprised of air and oxygen injected at a preheated temperature, usually between 1000° K. to 1600° K. The resulting product is pig iron, usually above 90 wt. %, with minor amounts of other elements such as carbon, silicon, sulfur, phosphorous, and manganese. A slag is also produced, containing oxidized materials such as $SiO_2$, $Al_2O_3$, CaO, MgO, $Na_2O$, and other impurities such as sulfur. Effluent gasses are vented at the top of the furnace and comprise mostly CO, $CO_2$, and $N_2$, with lesser amounts of $H_2$ and vaporized $H_2O$.

The compressed shapes, articles, or objects, made in accordance with the present invention, have strength and oxidizing properties that make it an ideal partial or complete substitute for coke in a iron making process. However, the compressed shapes may also be used in other processes requiring a carbonaceous fuel, such as, for example in electric arc furnaces as well as a household fuel, stoker boiler fuel, smokeless fuel, and fluidized-bed fuel.

Standard Coke Tests

Standard testing procedures for the various types of cokes to qualify each for blast furnace use have been developed over the years as the science and art of blast furnace operation and as the requirements of coke have become better understood. Prior to 1993, standard coke tests included (a) proximate analysis to determine chemical make-up, (b) drop shatter and tumbler tests to determine strength, and (c) specific gravity and porosity tests to measure structural characteristics. None of these tests are performed under the temperature and chemical environment that the coke encounters in the blast furnace. In recent years, the Japanese steel industry developed a procedure that attempted to test coke strength and breakdown to $CO_2$ attack under blast furnace conditions. In 1993 this test was adopted as an ASTM standard test for coke. It is known as ASTM D 534193 entitled Standard Test Method for Measuring Coke Reactivity Index (CRI) and Coke Strength After Reaction (CSR).

The joint CSR/CRI test comprises heating a bed of 200 grams of coke in a nitrogen atmosphere to 1100° C. in 30 minutes, reacting the coke sample in a flow of $CO_2$ for 120 minutes with the bed temperature constantly at 1100° C., cooling the sample to 100° C., transferring the sample to a tumbler, and tumbling the sample for 600 revolutions in 30 minutes. The sample is passed through a ⅜ inch sieve. The CSR is calculated as the portion remaining in the sieve compared to the amount removed from the furnace in weight percent. The CRI is by weight and comprises the percentage consumed calculated from the amount removed from the furnace and the amount introduced into the furnace.

The purpose of the CRI test is to definitively classify the ability of $CO_2$ to react with the carbon in the coke being tested, a necessary reaction in the blast furnace, but one which must be controlled to prevent carbon from being consumed prematurely. The CSR test provides information about two different issues, 1) the strength of the briquettes after reacting with $CO_2$, and 2) the amount of dust produced by $CO_2$ attack and bed agitation.

Fine dust can be detrimental in the blast furnace since it can decrease the permeability of the bed requiring increased blast pressure to force the air up through the bed. In general, cokes with CRI values within the range of about 20 to 40, and CSR values between about 45 to 70 are considered acceptable.

These tests can provide valuable insight into qualifying cokes for blast furnace use. However, care must be used in order to correctly interpret test results. Although the ability of a coke to pass the above-mentioned standard tests qualifies it for blast furnace use, a coke not meeting the strict standard tests may also perform satisfactorily in the blast furnace. For example, blast furnace tests performed in the 1970's using FMC form coke, (before the CSR and CRI tests were adopted), showed this coke to be a viable partial coke replacement fuel. However, the CSR/CRI procedure, if performed on the same FMC-form coke, would never qualify it for blast furnace use since its $CO_2$ reactivity far exceeds the CSR/CRI accepted value. In fact, it may be beneficial to have a portion of the coke charge with higher reactivity. This could allow for rapid conversion of $CO_2$ to CO, increasing the indirect reduction rate in the upper portion of the furnace and protecting the lower reactivity coke from $CO_2$ attack and allowing it to be saved for burden support and direct reduction in the lower portion of the furnace. The higher reactivity coke must be controlled so that it does not produce an inordinate amount of fines which would be detrimental to furnace operation.

During blast furnace operation coke is jettisoned onto a hot bed in a blast furnace, where it is reacted with a mixture of CO, $CO_2$, and $N_2$. As the coke begins to move downward through the bed, it is progressively heated and compressed. The temperature of the coke in the blast furnace may increase at a rate of about 400° C. per hour, and the weight upon the coke may increase by about seven pounds per square inch every hour. As the coke descends, the hot blast ascends at a velocity of about 7 feet per second. Further, as the coke descends in the furnace, the composition of the ascending gas changes.

In conclusion, while the CSR test more closely approximates blast furnace conditions than previous ASTM stability and hardness tests, there still remain substantial differences between the conditions of the tests and the blast furnace environment.

EXAMPLES

Example I

Compressed briquettes formed in accordance with the present invention were made and crush strengths were measured. Crush strength is important to determine whether the briquettes can maintain their integrity when exposed to the compressive forces exerted by the weight of the furnace burden. The ability to vary the strengths of the briquettes by varying the recipe and the process somewhat has been demonstrated.

Table I compares coke briquette crush strengths of briquettes, formed in accordance with principles of the present invention (INV), with those measured with conventional coke briquettes. As can be seen, the INV briquettes demonstrate compressive strengths comparable to or higher than those of conventional cokes.

TABLE I

Crush Strength of Various Cokes

| Coke Type | Crush Strength — Mean (lb/in$^2$) | Crush Strength — Standard Deviation (lb/in$^2$) |
| --- | --- | --- |
| Chinese Oven-Coke | 1810 | 540 |
| Porous Oven-Coke | 670 | 540 |
| Dense Oven-Coke | 1430 | 360 |
| Form Coke | 610 | 260 |
| INV Pet-coke briquette | 1400 | 450 |
| INV coke breeze (recipe 1) | 2420 | 460 |
| INV coke breeze (recipe 2) | 4160 | 560 |

The briquettes labeled with "INV" are briquettes made according to the invention by the above-described process, using different forms and sizes of the original carbonaceous material, i.e., petroleum coke and oven coke breeze.

Coke Briquettes use in Blast Furnaces

Comparing the properties of the briquettes made using the present invention with those of prior-art demonstrates that the present briquettes have strength properties suitable for use at least as a partial coke replacement in blast furnaces. Table II compares coke briquettes made according to the present invention (INV) with other cokes previously or currently used as blast furnace fuels, FMC-Form Coke, Oven coke, and generally accepted standard metallurgical coke properties.

TABLE II

Coke Properties

| | INV Coke Briquettes | FMC Form Coke | Oven Coke | "Standard" Metallurgical Coke |
| --- | --- | --- | --- | --- |
| Relative crushing strength (lb/in$^2$) | 1400–4000 | 600 | 1400 | 400–2000 |
| Apparent density (g/cm$^3$) | 1.2–1.5 | 0.8–1.2 | 0.9–1.3 | 0.85–1.3 |
| Bulk density (lb/ft$^3$) | na | 30–45 | na | 20–30 |
| Surface area (m$^2$/g) | na | 50–200 | na | 1–25 |
| Relative CO$_2$ reactivity (CRI) | 40–65 | 60–75 | 30–40 | 20–30 |
| Coke Strength (CSR) | 30–60 | 40–50 | 40–50 | 50–65 |

As can be seen, the properties of the present briquettes are favorable for blast furnace application. These briquettes, comprising discarded material and tar, are suitable as a partial replacement for oven coke. The data indicate that performance of the present briquettes may be superior to FMC-form coke, which is currently in use as a partial coke replacement product. FMC-form coke is currently only being used for phosphate manufacturing and not for blast furnace use. However, the FMC-form coke has been successfully tested in blast furnaces for up to 30% coke replacement but it is not currently being used for that purpose.

Example II

Various briquettes made according to the present invention were evaluated for suitability as a blast furnace fuel based upon the CSR and CRI values. The amounts and nature of the materials used in each composition are summarized below in Table III. In the table, the following abbreviations apply for the tar and or pitches used.
em An emulsion-based tar
en An enamel based tar.
ctp A coal tar pitch from Geneva Steel, Orem, Utah
pg The same as ctp.
p#1 An electrode binder pitch
p#2 A differentiated pitch
p#3 cove pitch (softening point=144° C.)
p#4 A pitch from Kaiser Steel The pitches 1 to 4 are coal tar pitches that vary in softening point and coal source. The pitches can be obtained from Reilly Industries, Utah County, Utah.

The acid used was 54% HNO$_3$ unless otherwise noted. A surfactant was used in three tests, 9, 25, 34 to see if it would allow the acid to wet the coal better. It is listed as surfactant and conditioner.

The carbonaceous materials used were prime petroleum coke, low-grade petroleum coke, and coke fines or metallurgical coke from steel manufacturing. In tests 38 to 41 the coke used was Clariton coke. All other references to coke fines ore metallurgical coke refer to Geneva coke.

FIGS. 2A through 2D show size distribution graphs for pulverized Geneva coke as received and pulverized petroleum coke, crushed Geneva coke, and pulverized and as collected Geneva coke breeze. Geneva coke and Geneva coke breeze are available at Geneva Steel in Utah County, Utah. For pulverized coke, the particle size was much smaller than the crushed coke, about 50 μm as compared to about ¼ inches.

The tars and coke were tested to determine which carbon forms are most susceptible to CO$_2$ attack, by reacting chars of the tars and the cokes with CO$_2$ at blast-furnace temperatures. The least susceptible was the char made from the coal tar pitch. The most susceptible was the low-quality petroleum coke.

The binder used was ETG 400, which comprises 90% water and 10% styrene monomer. There are two reagents used to make the styrene portion of the binder, which is chemically referred to as styrene butadiene latex. One is a self linking styrene monomer and the other is a cross linking styrene monomer. This material was obtained for the tests from Rhone-Poulenc, Specialty Chemical Division, Gastonia, N.C. The equivalent material is also available from several other companies such as Huntsman Chemical and Ashland Chemical.

In each of the tests identified below, the carbonaceous material, tar, and a mixing bucket were heated above the softening point of the tar. The carbonaceous material and the tar were mixed for a sufficient time to form a uniform blend, typically about 10 minutes. The binder was then blended in and the mixing continued for a sufficient time to form a uniform blend, usually on the order of about 3 or 4 minutes.

The resulting blend was then briquetted in the standard briquetting press running at a slow speed. The briquetting was at 1550 psi, except for Test No. 5 (1600 psi), Test No. 13 (1750 psi), Test No. 33 (1900 psi), and Test Nos. 40, 41, and 42 (1850 psi). Afterwards curing took place in a drying oven at 325° F. for about 2 hours.

TABLE III

Carbon Particle/Tar Briquettes

| Test No. | Weight Carbon Particles (lb.) | Carbon Particles | Tar (lb.) | Nitric Acid (lb.) | Binder (lb.) | CSR | CRI |
|---|---|---|---|---|---|---|---|
| 1 | 15 | Coke Fines (<75 μm) | 2.25 (em) | 0.33 | 0.5 | 27 | 44 |
| 2 | 15 | Coke Breeze (<400 μm) | 3 (em) | 0.33 | 0.5 | 17 | 45 |
| 3 | 15 | Geneva Coke Fines (<400 μm) | 3 (en) | 0.33 | 0.5 | 12 | 39 |
| 4 | 15 | Fines Geneva Coke | 3 (em) | 0.66 | 0.5 0.25 lb. >400 mesh coke fines mixed with 0.25 lb. PVA | 0 | |
| 5 | 15 | coke fines 20% +5 mesh (−¼ in.) 40% 5 to 100 mesh 40% −100 mesh | 3 (en) | 0.66 | 0.5 | 14 | 41 |
| 6 | 10 | coke fines 50% ground 50% pulverized | 2 (en) | 0 | 0.33 | 3 | 43 |
| 7 | 10 | coke fines 50% ground 50% pulverized | 3.5 (en) | 0 | 0 | 11 | 41 |
| 8 | 10 | coke fines <55 μm | 1.5 (em) | 0.22 | 0.33 | 28 | 46 |
| 9 | 10 | coke fines — pulverized | 1.5 (ctp) | 0.66 surfactant | 0.33 | 29 | 46 |
| 10 | 10 | coke fines — pulverized | 1.5 (ctp) | 0.22 | 0.33 | 33 | 44 |
| 11 | 10 | petroleum coke fines (−60 mesh) | 1.5 (em) | 0.22 | 0.33 | 60 | 64 |
| 12 | 10 | coke fines — pulverized | 1.25 (ctp) | 0 | 0 | 19 | 49 |
| 13 | 10 | 50% petroleum coke 50% metallurgical coke | 1.5 (ctp) | 0.22 | 0.33 | 40 | 55 |
| 14 | 10 | metallurgical coke | 1.5 (p#1) | 0.22 | 0.33 | 22 | 48 |
| 15 | 10 | metallurgical coke | 1.5 (p#2) | 0.22 | 0.33 | 23 | 44 |
| 16 | 10 | metallurgical coke | 1.5 (p#3) | 0.22 | 0.33 | 18 | 50 |
| 17 | 10 | metallurgical coke | 1.5 (p#4) | 0.22 | 0.33 | 27 | 44 |
| 18 | 10 | low grade petroleum coke | 1.5 (em) | 0.22 | 0.33 | 62 | 56 |
| 19 | 10 | 68% — low grade petroleum coke 32% — metallurgical coke | 1.5 (em) | 0.22 | 0.33 | 33 | 54 |
| 20 | 10 | pulverized metallurgical coke | 1.5 (em) | 0.22 | 0.17 | 35 | 42 |
| 21 | 10 | pulverized metallurgical coke | 1.5 (em) | 0.625 | 0.33 | 30 | 47 |
| 22 | 10 | pulverized metallurgical coke (floated) | 1.5 (em) | 0.22 | 0.33 | 31 | 44 |
| 23 | 10 | pulverized metallurgical coke | 1.5 (em) | 0.44 H$_2$SO$_4$ | 0.33 | 9 | 50 |
| 24 | 10 | pulverized metallurgical coke | 1.5 (em) | 0.44 HCl | 0.33 | 28 | 52 |
| 25 | 10 | pulverized metallurgical coke | 1.5 (em) | 0.22 (+0.5 lb surfactant) | 0.33 | 28 | 51 |
| 26 | 10 | 75% — low grade petroleum coke 25% — pulverized metallurgical coke | 1.5 (em) | 0.22 | 0.33 | 30 | 60 |
| 27 | 10 | 25% — low grade petroleum coke 75% — pulverized | 1.5 (em) | 0.22 | 0.33 | 28 | 53 |

TABLE III-continued

Carbon Particle/Tar Briquettes

| Test No. | Weight Carbon Particles (lb.) | Carbon Particles | Tar (lb.) | Nitric Acid (lb.) | Binder (lb.) | CSR | CRI |
|---|---|---|---|---|---|---|---|
| 28 | 10 | metallurgical coke<br>metallurgical coke (floated) | 1.5 (em) | 0.22 | 0.17 | 26 | 35 |
| 29 | 10 | pulverized metallurgical coke | 1.2 (em) | 0.22 | 0.17 | 17 | 48 |
| 30 | 10 | pulverized metallurgical coke | 2.0 (em) | 0.22 | 0.17 | 21 | 51 |
| 31 | 10 | 75% low grade petroleum coke<br>25% metallurgical coke | 1.2 (em) | 0.22 | 0.17 | 1 | 67 |
| 32 | 10 | 75% low grade petroleum coke<br>25% pulverized metallurgical coke | 1.2 (pg) | 0.22 | 0.33 | 53 | 40 |
| 33 | 10 | pulverized metallurgical coke | 1.5 (em) | 0.22 | 0.33 | 26 | 41 |
| 34 | 10 | pulverized metallurgical coke | 1.5 (em) | 0.22 | 0.33 + 0.33 lb. conditioner | 22 | 40 |
| 35 | 10 | pulverized metallurgical coke | 1.5 (em) | 0.22 | 0.33 | 23 | 36 |
| 36 | 10 | screened pulverized metallurgical coke (−270 mesh) | 1.5 (em) | 0.22 | 0.33 | 34 | 51 |
| 37 | 10 | pulverized metallurgical coke (floated) | 1.5 (em) | 0.31 | 0.13 | 35 | 40 |
| 38 | 10 | Clariton coke (ground) | 1.5 (em) | 0.31 | 0.13 | 25 | 42 |
| 39 | 10 | Clariton coke (pulverized) | 1.5 (em) | 0.31 | 0.13 | 41 | 38 |
| 40 | 10 | 90% petroleum coke (screened −20 mesh)<br>10% pulverized Clariton coke | 1.5 (em) | 0.31 | 0.13 | 41 | 65 |
| 41 | 10 | 90% petroleum coke (screened −20 mesh)<br>10% pulverized Clariton coke | 1.5 (em) | 0.22 | 0.33 | 2 | 67 |
| 42 | 10 | pulverized petroleum coke (mean diameter ~82 μm) | 1.5 (em) | 0.22 | 0.33 | 3 | 63 |
| 43 | 10 | pulverized petroleum coke | 2.0 (em) | 0.22 | 0.33 | | |

While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention which do not depart from the spirit of the invention.

What is claimed and desired to be secured by Letters Patent is:

1. A process for manufacturing solid fuel objects from fine carbonaceous materials, the process comprising:
    providing finely divided particles of carbon material from a source;
    treating the carbon material with an acid;
    blending a reactive coke-forming tar with the treated carbon particles and a polymeric binder reactive with tar-related carbon reactive sites, the tar being blended in an amount sufficient to provide tar-related reactive sites for reaction with the binder and effective to form the blend into a solid;
    applying pressure to the blend effective to create solid fuel objects from the blend;
    curing the solid fuel objects into a long chain polymer compound of the carbon particles, the tar, and the polymeric binder.

2. A process for manufacturing solid fuel objects according to claim 1 wherein the tar is blended in an amount between 10 and 20 weight percent of the total weight of the blend.

3. A process for manufacturing solid fuel objects according to claim 1 wherein the reactive polymeric binder comprises one or more of the following ingredients: styrene, cross-linking styrene, polyvinyl acetate homopolymer, polyvinyl alcohol, and acrylonitrile polymers.

4. Solid fuel objects comprising a reaction product of a mixture comprised of carbonaceous fine particles, reactive tar, and a polymeric reactive binder, the binder being in an amount sufficient to provide tar-provided reactive sites for reaction with the binder and effective to react the mixture into solid shapes.

5. Solid fuel objects according to claim 4 wherein the effective amount of tar is between 10 and 20 weight percent of the total weight of the mixture.

6. Solid fuel objects according to claim 4 wherein the reactive polymeric binder comprises one or more of the following ingredients: styrene, cross-linking styrene, polyvinyl acetate homopolymer, polyvinyl alcohol, and acrylonitrile polymers.

7. Fuel articles comprising the reaction product of a mixture of carbonaceous particles, reactive tar, and binder, the articles having a CSR between about 45 and 70, and a CRI between about 20 and 40, the binder being in an amount sufficient to provide tar-based reactive sites for reaction with the binder and effective to form the mixture into solid shapes.

8. Fuel articles according to claim 7 wherein the effective amount of tar is between 10 and 20 weight percent of the total weight of the mixture.

9. Fuel articles according to claim 7 wherein the reactive polymeric binder comprises one or more of the following ingredients: of styrene, cross-linking styrene, polyvinyl acetate homopolymer, polyvinyl alcohol, and acrylonitrile polymers.

10. Solid fuel objects comprising a reaction product of carbonaceous fine particles and reactive tar cross-linked by a reactive polymeric binder, the tar being in an amount sufficient to provide reactive sites for reaction with the binder and effective to form a reacted mixture of the particles, tar, and binder as solid objects.

11. A method of forming solid fuel pieces from material comprised of waste carbon material selected from the group consisting of coke breeze, petroleum coke, and metallurgical coke, coal fines, and revert materials, comprising the steps of:

combining the carbon material with polymeric binder, oxidizing acid, and a reactive tar in effective amounts;

selectively mixing and reacting the above-mentioned ingredients;

compressing the reacted mixture into solid fuel pieces.

12. A method according to claim 11 wherein the reactive tar comprises a tar selected from the group consisting of coal tars and pitches derived from coal distillation and coking processes, petroleum distillate tars and residues, syrups of sugar and similar carbohydrate materials, and other high-molecular weight aromatic hydrocarbons.

13. A method according to claim 11 wherein the oxidizing acid comprises an acid selected from the group consisting of nitric acid, hydrochloric acid, sulfuric acid, phosphoric acid, carbonic acid, and any strong carboxylic acid.

14. A method according to claim 11 wherein the oxidizing acid comprises a concentrated mineral acid.

15. A method according to claim 14 wherein the oxidizing acid comprises nitric acid.

16. A method according to claim 11 wherein the combining step comprises placing the waste carbon material and reactive tar together and mixing until a well blended mix is obtained.

17. A method according to claim 16 wherein the oxidizing acid is added to the waste carbon material before the placing step.

18. A method according to claim 16 wherein the oxidizing acid is placed with the waste carbon material and reactive tar.

19. A method according to claim 16 wherein the polymeric binder is blended into the mix after the placing step.

20. A method according to claim 16 wherein the combining step comprises heating the waste carbon material to a temperature above the softening point of the reactive tar before combining the waste carbon material and the reactive tar.

21. A method according to claim 11 wherein the combining step comprises combining the oxidizing agent and the reactive tar with a polymeric binder chosen from the group consisting of styrene, cross-linking styrene, polyvinyl acetate homopolymer, polyvinyl alcohol, acrylonitrile polymers, and mixtures thereof.

22. A method according to claim 21 wherein the polymeric binder comprises cross-linking styrene.

23. A method according to claim 11 further comprising the step of combining a surfactant with the waste carbon material and the oxidizing acid to assist in wetting the waste carbon material by the acid.

* * * * *